C. A. WILSON.
MUFFLER.
APPLICATION FILED AUG. 13, 1913.
1,125,426. Patented Jan. 19, 1915.
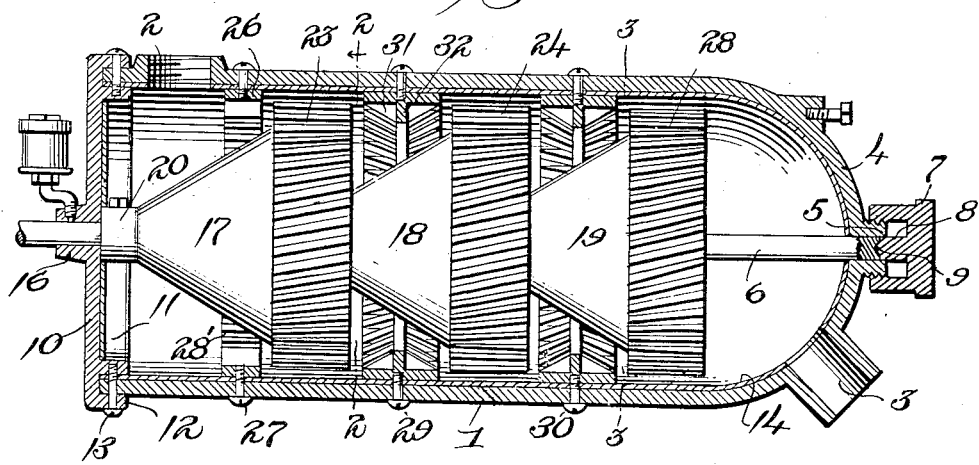
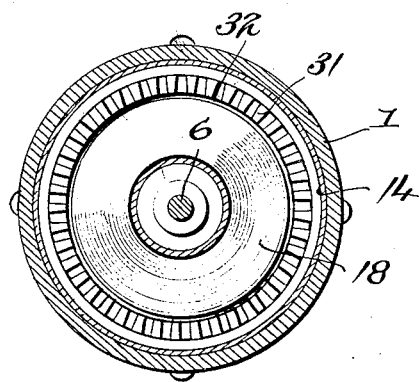
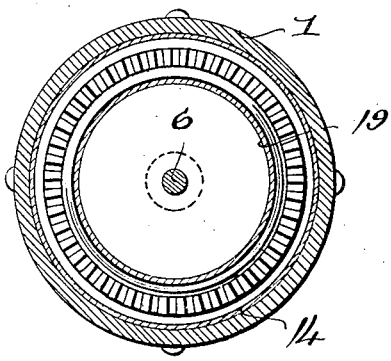
Witnesses
Carroll Bailey
C. H. Crawford
Inventor
Charles A. Wilson,
Richard Owen,
his Attorney

UNITED STATES PATENT OFFICE.

CHARLES A. WILSON, OF WINCHESTER, ILLINOIS.

MUFFLER.

1,125,426. Specification of Letters Patent. Patented Jan. 19, 1915.

Application filed August 13, 1913. Serial No. 784,631.

*To all whom it may concern:*

Be it known that I, CHARLES A. WILSON, a citizen of the United States, residing at Winchester, in the county of Scott and State of Illinois, have invented certain new and useful Improvements in Mufflers, of which the following is a specification.

This invention relates to improvements in mufflers for the exhaust gases of explosive engines and has for its object to silence the noise incident to the discharge of gases and modify or change the discharge from intermittent explosive puffs to a practically constant and noiseless stream.

A further object of the invention is to utilize the power generated in the muffler incident to the restriction of flow offered to the gases so that the device of my invention can be employed to run or drive a magneto, cooling fan or other device required for operation, this last feature being pertinent to the use of the invention on an automobile.

A further object of the invention is to split or shred the gases and cause the same to take such a path as will serve to impart rotary movement to one or more rotors disposed in the muffler.

Other features and objects of the invention will be more fully described in connection with the accompanying drawings and more particularly pointed out in and by the appended claims.

In the drawing; Figure 1, is a longitudinal, vertical, sectional view of one form of my invention. Fig. 2, is a sectional view taken on line 2—2 of Fig. 1. Fig. 3, is a sectional view taken on line 3—3 of Fig. 1.

Like characters of reference designate similar parts throughout the different figures of the drawing.

As illustrated, 1, designates a casing having an inlet 2, and an outlet 3, the former being adapted for connection with the exhaust of an internal combustion engine, and the latter being open to atmosphere.

The outlet end 4, of the casing 1, may be dome shaped and provided with a journal bearing 5, for one end of a shaft 6. I preferably concave the end of the shaft 6, and provide a hard oil cup 7, which is adapted to be threaded onto the bearing 5, and which is provided with an axial stud 8, having a rounded end 9, adapted to seat in the concaved end of the shaft 6. A head 10, is provided to close the other end of the casing 1, and the head 10, is provided with inner and outer flanges 11 and 12, between which the wall of the casing is secured by screws 13. The casing may be lined with asbestos or like material as indicated at 14. A special lining of like material is provided for the head 10. The shaft 6, is journaled in a bearing 16, in the head 10, and projects therefrom for operative connection with any device which is to be driven thereby.

While I have referred to the utility of this invention as a driving means, I wish it understood that it is capable of performing its functions as a muffler, without running wild, irrespective as to whether or not it is utilized as a motor.

Disposed in the path of the gases from the inlet 2, to the outlet 3, are a plurality of alternately disposed impeding elements, and in the present construction, some of said elements are rotary while the others are stationary, the stationary elements in the present construction also acting as reversing elements for the gases.

It is one of the features of my invention to provide rotary impeding elements which will gradually, and preferably consecutively act to neutralize the momentum of the gases by presenting relative extensive areas thereto, so disposed as to revolve the rotating elements so that the drive transmitted thereto by the gases, will act to impede the flow of the gases with the least possible back pressure.

As shown, I mount upon the shaft 6, three rotors 17, 18, and 19, of cone or funnel form with the larger ends farthest from the point of gas ingress and the smaller ends nearest such point. Each rotor may be provided with a hub, as indicated at 20, 21, and 22, and set screws may be provided to lock the rotors to the shaft 6, as clearly shown in Fig. 1. It will be seen that the gases entering at the inlet 2, will be deflected by the flaring or conical rotor 17, toward the periphery of the casing and in order to provide a relatively extensive driving area for the rotors, I dispose on the rotor 17, a plurality of blades which are inclined with respect to their axis of rotation so that engagement of the gases therewith will tend to impart rotary movement to the rotor 17. The rotor 18, is provided with exteriorly disposed blades 24, and the rotor 19, is provided with exteriorly disposed blades 28, and all of the rotors are of the same construction and are similar in operation. Furthermore, the rotors are hollow wheels so that interior chambers are provided therein, of substantially the contour of the exteriors thereof.

Prior to engagement of the gases with the blades 23, of the first rotor 17, I dispose a stationary impeding element which may be in the form of a relatively narrow ring 26, secured to the casing 1, by means such as screws 27, and provided with radially inwardly projecting blades 28', which are disposed substantially longitudinally of the casing so as to split or shred the gases in their passage toward the blades 23.

The gases delivered from the blades 23, discharge and move toward an impeding element, which is stationary, and which also functions as a reversing element. In the present construction two of these stationary impeding elements is shown, the first of which is designated as a whole at 29, and the second of which is designated at 30. Both of these elements are similar in construction and operation and only one need be described in detail.

The impeding element 29, is in the form of a ring having longitudinally and radially extending blades 31, which preferably diverge radially, outwardly from their greatest central depth to the margins of the ring 21.

The passages between the blades 31, are interrupted by an imperforate flange or partition 32, which projects radially inwardly from the blades 23 so that the gases discharged from between the latter will be deflected or reversed down along the exterior of rotor 18, and into the interior of rotor 17, thereby creating in such interior an eddy of such momentum as to cushion or buffet and act to equalize the pressure of the gases to deaden the explosive puffing discharge of the gases.

As the greatest amount of heat, due to friction, will occur at the point of reversal of movement of the gases by the flange or partition 32, a greater amount of carbon deposit will result and be collected in the interior of rotor 17. The gases act upon the blades of the successive rotors and are reversed by the impeding elements 29 and 30, disposed alternately with respect to the rotors, the gases discharged from the blades 25, exhausting to atmosphere at the outlet 3.

A relatively greater drive will be imparted to the first rotor and the momentum of the gases will be gradually used up and transformed into rotary motion so that a relatively low drive thrust will be imparted to the last rotor 19, wherefrom the gases will pass to atmosphere in a continuous but noiseless stream through the outlet 3. It will thus be seen that while I gradually impede the passage of the gases, passing the several impeding elements, I do not create back pressure because of the large surface areas presented to the passing gases and the fact that said surfaces are relatively open and widely spaced.

In the present construction where all of the rotors are locked to the shaft for the purpose of imparting a rotary driving thrust thereto, there will be a certain prescribed action of the gases moving longitudinally through the casing because of the uniformity of rotation of the rotors, one with respect to the other. It will be seen however, that if the rotors are independently revolubly mounted, or capable of rotating independently of each other by having the set screws engage the annular grooves in the shaft, then, and in that event, each rotor would merely act as an impeding element and it could freely rotate under whatever driving thrust might be imparted thereto in accordance with the momentum or speed of flow of the gases adjacent such rotor. In this form, the rotors would not act as driving elements and the end rotor, for instance, could remain stationary if the prior impeding elements neutralized the intermittent puffing discharge of the gases, or it might rotate providing the gases at the last rotor had sufficient momentum to rotate the same.

While I have herein shown and described one specific form of my invention, I do not wish to be limited thereto except for such limitations as the claims may import.

I claim:

1. A muffler comprising a casing for the passage of exhaust gases therethrough, and a plurality of alternately disposed rotary and fixed gas impeding elements each having gas passages formed in the general line of flow of the gas through the muffler received and mounted within said casing.

2. A muffler comprising a casing for the passage of exhaust gases therethrough, gas impeding elements disposed in a fixed relation in said casing, rotary gas impeding elements mounted adjacent said fixed elements and said elements provided with fluid passages arranged in the general line of flow of the gas through the muffler.

3. A muffler comprising a casing for the passage of exhaust gases therethrough, a plurality of alternately disposed gas-impeding devices, and each of said devices provided with fluid passages formed in the general line of passage of the gases through the muffler adapted to reverse the path of travel of the gas upon its abutment with the impeding devices.

4. A muffler comprising alternately disposed fixed and hollow rotary gas impeding elements each provided with blades, the fixed elements being provided with partitions for reversing the flow of gas into and forming eddies in said hollow rotary elements.

5. A muffler comprising in combination, a casing having on its interior a plurality of spaced gas impeding elements provided with blades and a partition for reversing the gases, and a plurality of rotors having diverging bodies for directing the gases outwardly and blades for driving engagement by the gases, the blades of the rotary elements being disposed between the said spaced elements.

6. A muffler comprising in combination, a casing, a plurality of hollow rotors each having exterior blades inclined to their axis of rotation for engagement by the gases to revolve said rotors, and bladed elements between said rotors for directing the gases discharged from said rotors into the hollow interior thereof to form eddies therein.

7. A muffler comprising in combination, a casing having an inlet and outlet for passage therethrough of the exhaust gases, a fixed element having blades for shredding or splitting the gases, a rotor having a diverging wall for directing the gases outwardly toward said element and provided with blades in the rear of said element for driving engagement by the gases discharged from said element.

8. A muffler comprising in combination, a casing having an inlet and an outlet for passage therethrough of the exhaust gases, a plurality of rotors in the path of the gases provided with blades inclined to their axes of rotation for engagement with the gases to be driven thereby, and fixed bladed impeding elements between the first two and last two rotors.

9. A muffler comprising in combination, a plurality of hollow rotors provided with circumferentially disposed blades adapted for successive engagement by the gases to be driven thereby, and fixed bladed and impeding elements in the rear of the first rotor and in advance of the last rotors and reversing the direction of and causing the gases to enter the hollow interior of the first and the next to the last rotor.

10. A muffler comprising a casing for the passage of exhaust gases therethrough, a plurality of impeding devices mounted at fixed points within said casing, a plurality of rotary impeding devices disposed between said fixed impeding devices and each of said impeding devices having fluid passages formed therein in the general line of flow of the gas through the muffler and arranged to cause rotation of said rotary impeding devices.

11. A muffler comprising in combination, a casing for the passage of exhaust gases therethrough, a plurality of fixed elements located within the casing around the wall thereof, a plurality of rotary elements alternately positioned with respect to said fixed elements, each of said fixed elements having fluid passages on the inner periphery thereof, a plurality of fluid passages provided on the outer periphery of each of said rotary elements, and all of said passages arranged to lie in the general line of passage of the gas through the muffler and so disposed that the rotary elements are caused to revolve and a forward and reverse whirling action is imparted to the moving gas body.

In testimony whereof I affix my signature in presence of two witnesses.

CHARLES A. WILSON.

Witnesses:
JESSE WILSON,
J. M. RIGGS.